United States Patent
Shibayama (10) Patent No.: US 8,139,214 B2
(45) Date of Patent: Mar. 20, 2012

(54) SPECTROSCOPY MODULE, AND METHOD FOR MANUFACTURING THE SAME

(75) Inventor: Katsumi Shibayama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 275 days.

(21) Appl. No.: 12/465,264

(22) Filed: May 13, 2009

(65) Prior Publication Data

US 2009/0284743 A1    Nov. 19, 2009

(30) Foreign Application Priority Data

May 15, 2008  (JP) ............................... P2008-128687
Dec. 5, 2008  (JP) ............................... P2008-311086

(51) Int. Cl.
*G01J 3/18* (2006.01)
(52) U.S. Cl. ....................................... 356/328; 356/326
(58) Field of Classification Search .................. 356/326, 356/328; 156/60, 327; 228/175; 29/428
See application file for complete search history.

(56) References Cited

U.S. PATENT DOCUMENTS

| | | | |
|---|---|---|---|
| 4,644,632 A | 2/1987 | Mächler et al. | |
| 5,995,221 A | 11/1999 | Slutter et al. | |
| 6,081,331 A | 6/2000 | Teichmann | |
| 6,303,934 B1 | 10/2001 | Daly et al. | |
| 6,538,736 B1 | 3/2003 | Palumbo | |
| 6,859,274 B2 | 2/2005 | Inamoto | |
| 7,697,137 B2 | 4/2010 | Comstock, II | |
| 7,864,317 B2 | 1/2011 | Bockstaele et al. | |
| 2002/0060792 A1 | 5/2002 | Ibsen et al. | |
| 2003/0197862 A1 | 10/2003 | Cohen et al. | |
| 2006/0268269 A1 | 11/2006 | Warren | |
| 2008/0123095 A1 | 5/2008 | Hubner et al. | |
| 2009/0284741 A1 | 11/2009 | Shibayama et al. | |
| 2009/0284742 A1 | 11/2009 | Shibayama | |
| 2009/0290154 A1 | 11/2009 | Shibayama et al. | |
| 2009/0290155 A1 | 11/2009 | Shibayama et al. | |
| 2009/0290164 A1 | 11/2009 | Shibayama et al. | |
| 2011/0075143 A1 | 3/2011 | Shibayama et al. | |

FOREIGN PATENT DOCUMENTS

| | | |
|---|---|---|
| DE | 197 17 015 | 10/1998 |
| FR | 2 847 978 | 6/2004 |
| JP | 04-287001 | 10/1992 |
| JP | 4-294223 | 10/1992 |

(Continued)

OTHER PUBLICATIONS

U.S. Appl. No. 12/992,398, filed Feb. 10, 2011, Shibayama.

(Continued)

*Primary Examiner* — Layla Lauchman
(74) *Attorney, Agent, or Firm* — Drinker Biddle & Reath LLP (57) ABSTRACT

In a spectroscopy module 1, a light passing hole 5*b* through which a light L1 advancing to a spectroscopic portion 4 passes is formed in a light detecting element 5. Therefore, it is possible to prevent the relative positional relationship between the light passing hole 5*b* and a light detecting portion 5*a* of the light detecting element 5 from deviating. Moreover, the light to be measured L1 advancing to the spectroscopic portion 4 via the light passing hole 5*b* and the diffracted lights L2 advancing to the light detecting portion 5*a* from the spectroscopic portion 4 pass through a void formed between the light detecting element 5 and the substrate 2 by an opening portion 10*a* of a wiring substrate 10. Therefore, according to the spectroscopy module 1, it is possible to improve the reliability.

8 Claims, 4 Drawing Sheets

FOREIGN PATENT DOCUMENTS

| | | |
|---|---|---|
| JP | 06-167637 | 6/1994 |
| JP | 08-145794 | 6/1996 |
| JP | 2592081 | 3/1999 |
| JP | 2000-065642 | 3/2000 |
| JP | 2000-298066 | 10/2000 |
| JP | 2003-139611 | 5/2003 |
| JP | 2003-243444 | 8/2003 |
| JP | 2004-191246 | 7/2004 |
| JP | 2004-309146 | 11/2004 |
| JP | 2004-354176 | 12/2004 |
| JP | 2007-199540 | 8/2007 |
| WO | WO 2008/029852 | 3/2008 |
| WO | WO 2008/149939 | 12/2008 |
| WO | WO 2008/149940 | 12/2008 |
| WO | WO 2008/149944 | 12/2008 |

OTHER PUBLICATIONS

U.S. Appl. No. 12/992,428, filed Feb. 23, 2011, Shibayama.
U.S. Appl. No. 12/992,445, filed Feb. 2, 2011, Shibayama.
U.S. Appl. No. 12/992,412, filed Feb. 28, 2011, Shibayama.
U.S. Appl. No. 12/992,469, filed Feb. 8, 2011, Shibayama.
H.W. Teichmann, et al., "Replizierter Mikro-Optischer Sensor Fur Die Industrielle Spektralsensorik", tm-Technisches Messen, vol. 68, No. 5, May 2001, pp. 200-203 (with partial English-language translation).

SPECTROSCOPY MODULE, AND METHOD FOR MANUFACTURING THE SAME

BACKGROUND OF THE INVENTION

1. Field of the Invention

The present invention relates to a spectroscopy module that disperses and detects light, and a method for manufacturing the same.

2. Related Background of the Invention

There is known such a conventional spectroscopy module described in, for example, Japanese Published Unexamined Patent Application No. H04-294223, Japanese Published Unexamined Patent Application No. 2000-65642, and Japanese Published Unexamined Patent Application No. 2004-354176. Patent Document 1 has described a spectroscopy module which is provided with a supporting body through which light is allowed to transmit, an incident slit portion through which light is made incident into the supporting body, a concave diffraction grating that disperses the light made incident into the supporting body to reflect the light, and a diode that detects the lights dispersed and reflected by the concave diffraction grating.

SUMMARY OF THE INVENTION

However, in the spectroscopy module described in Japanese Published Unexamined Patent Application No. H04-294223, when the incident slit portion and the diode are attached to the supporting body, the relative positional relationship between the incident slit portion and the diode may deviate, thereby degrading the reliability of the spectroscopy module.

The present invention has been achieved in consideration of the above-described circumstances, and an object of the present invention is to provide a highly reliable spectroscopy module and a method for manufacturing the same.

In order to achieve the above-described object, a spectroscopy module according to the present invention includes a body portion through which light is allowed to transmit, a spectroscopic portion that disperses a light made incident into the body portion from a side of a predetermined plane of the body portion, to reflect lights to the side of the predetermined plane, a light detecting element having a light detecting portion which is disposed on the predetermined plane via an intermediate substrate, the light detecting element having the light detecting portion detects the lights dispersed by the spectroscopic portion, and in the light detecting element, a light passing hole through which a light advancing to the spectroscopic portion passes is formed, and an opening portion through which the light advancing to the spectroscopic portion via the light passing hole and the lights advancing to the light detecting portion from the spectroscopic portion pass, is formed in the intermediate substrate.

In the spectroscopy module, the light passing hole through which a light advancing to the spectroscopic portion passes is formed in the light detecting element. Therefore, it is possible to prevent the relative positional relationship between the light passing hole and the light detecting portion of the light detecting element from deviating. Moreover, the light advancing to the spectroscopic portion via the light passing hole (the light to be measured) and the lights advancing to the light detecting portion from the spectroscopic portion (the diffracted lights) pass through a void formed between the light detecting element and the body portion by the opening portion of the intermediate substrate. Thereby, it is possible to prevent a situation in which the light to be measured and the diffracted lights are scattered or the like due to a resin adhesive or the like interposed between the light detecting element and the body portion. Therefore, it is possible to prevent generation of stray light, and it is possible to obtain a highly precise spectroscopic property. Therefore, according to the spectroscopy module, it is possible to improve the reliability.

In the spectroscopy module according to the present invention, a wiring for electrically connecting the light detecting element to the outside is preferably provided on the intermediate substrate. According to this configuration, there is no need to provide a wiring on the body portion, and an attempt can be made to lower the cost of the spectroscopy module.

In the spectroscopy module according to the present invention, the intermediate substrate preferably has a light-blocking property. In this case, it is possible to block a light advancing to the spectroscopic portion without passing through the light passing hole in the intermediate substrate, which makes it possible to prevent generation of stray light.

In the spectroscopy module according to the present invention, the intermediate substrate and the light detecting element are preferably bonded to one another along a rim of the opening portion with a resin adhesive. According to this configuration, when the light detecting element is bonded to the intermediate substrate with the resin adhesive, the resin adhesive is stopped at the rim of the opening portion due to its surface tension or the like, and does not penetrate into the opening portion. Therefore, it is possible to reliably maintain the void formed between the light detecting element and the intermediate substrate.

A method for manufacturing a spectroscopy module according to the present invention, which is provided with a body portion through which light is allowed to transmit, a spectroscopic portion that disperses a light made incident into the body portion from a side of a predetermined plane of the body portion, to reflect lights to the side of the predetermined plane, and a light detecting element having a light detecting portion that detects the lights dispersed by the spectroscopic portion, the method for manufacturing the spectroscopy module includes a light detecting element disposing process of disposing the light detecting element in which a light passing hole is formed, to an intermediate substrate in which an opening portion through which the light advancing to the spectroscopic portion via the light passing hole and the lights advancing to the light detecting portion from the spectroscopic portion pass, is formed, an intermediate substrate disposing process of disposing the intermediate substrate onto the predetermined plane after the light detecting element disposing process, and a spectroscopic portion disposing process of disposing the spectroscopic portion into the body portion.

According to the method for manufacturing the spectroscopy module, when the intermediate substrate is bonded to the predetermined plane of the body portion with a resin adhesive after the light detecting element in which the light passing hole is formed is disposed on the intermediate substrate, a void formed in the opening portion and the outside are communicated with each other via the light passing hole, and therefore, the resin adhesive satisfactorily spreads over the region between the light detecting element and the predetermined plane, which makes it possible to uniformly bond the light detecting element. Moreover, when the resin adhesive between the light detecting element and the body portion is cured, even if a gas is generated from the resin adhesive, the gas flows out to the outside through the opening portion and the light passing hole. Therefore, it is possible to prevent a decrease in light detection capability under the effect of the gas accumulated in the opening portion. Therefore, according to the method for manufacturing the spectroscopy module, it is possible to improve the reliability.

DESCRIPTION OF THE PREFERRED EMBODIMENTS

Hereinafter, preferred embodiments of the present invention will be described in detail with reference to the drawings. In addition, the same or corresponding portions in the respective drawings are denoted by the same reference numerals, and overlapping descriptions thereof will be omitted.

Figure 1:
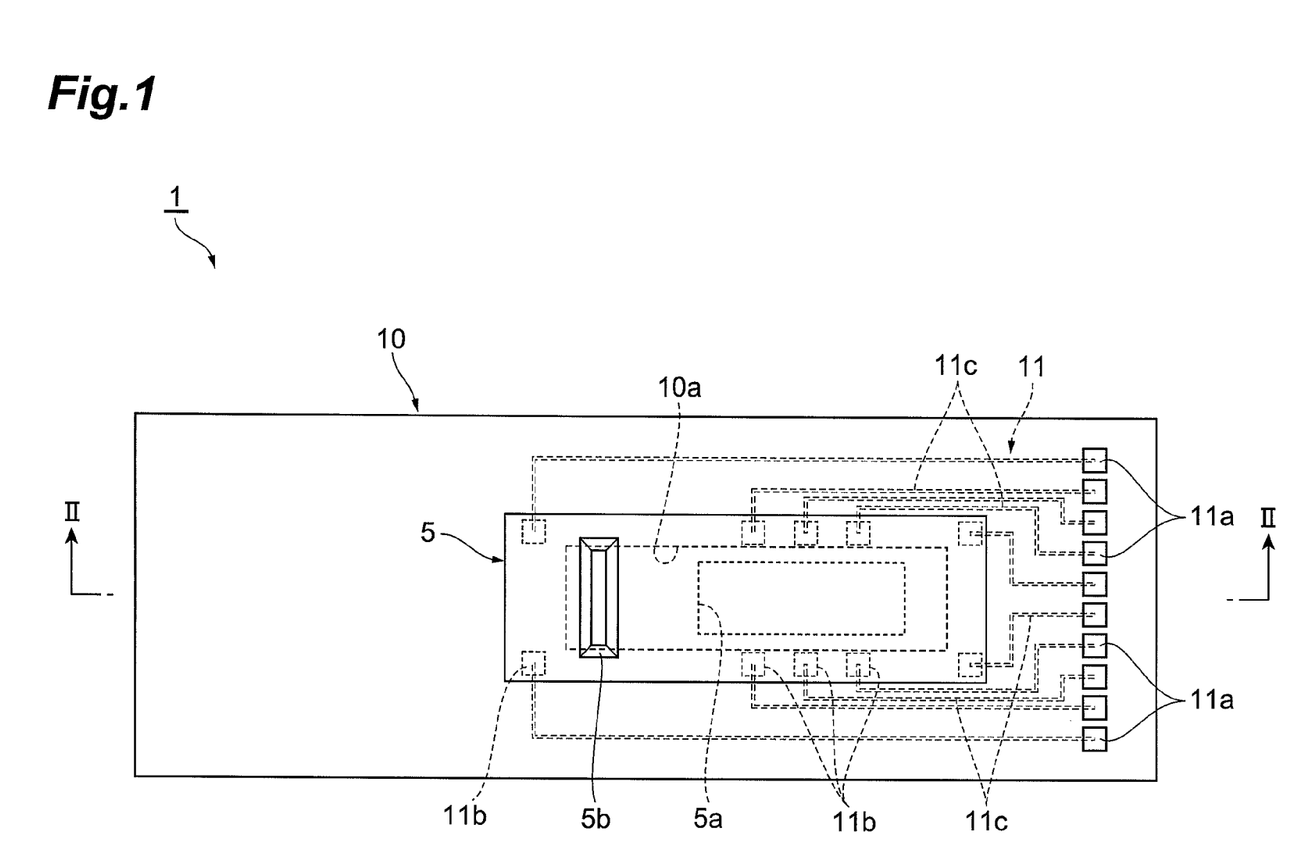
FIG. 1 is a plan view of a spectroscopy module as one embodiment according to the present invention.
Figure 2:
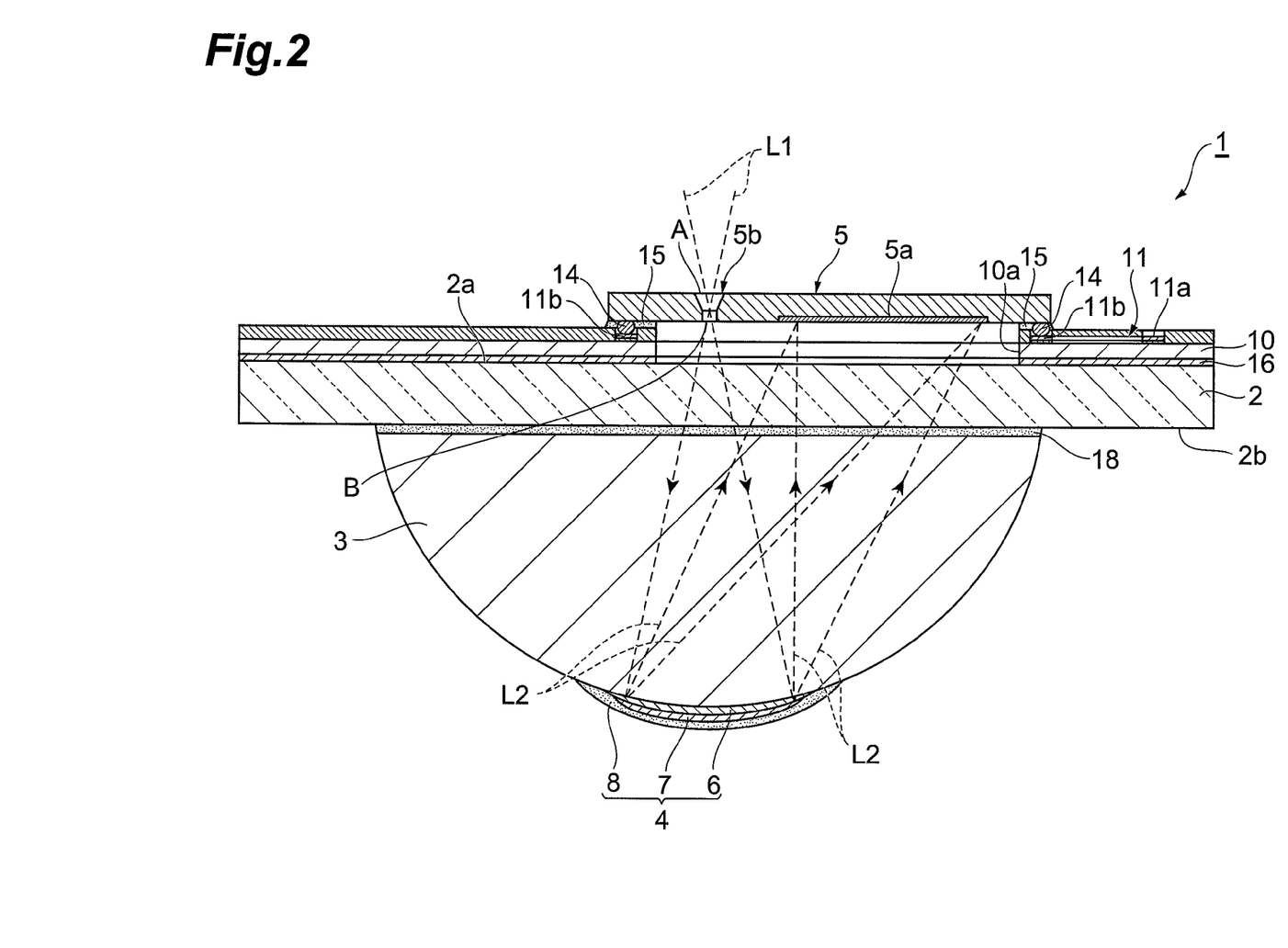
FIG. 2 is a cross sectional view taken along the line II to II shown in FIG. 1.

FIG. 1 is a plan view of a spectroscopy module as one embodiment according to the present invention, and FIG. 2 is a cross sectional view taken along the line II to II shown in FIG. 1. As shown in FIG. 1 and FIG. 2, a spectroscopy module 1 is provided with a substrate (body portion) 2 through which a light L1 made incident from a side of a front plane (predetermined plane) 2a is allowed to transmit, a lens portion (body portion) 3 through which the light L1 made incident into the substrate 2 is allowed to transmit, a spectroscopic portion 4 that disperses the light L1 made incident into the lens portion 3 to reflect the light toward the front plane 2a, and a light detecting element 5 that detects lights L2 dispersed by the spectroscopic portion 4. The spectroscopy module 1 is a micro-spectroscopy module that disperses the light L1 into the lights L2 corresponding to a plurality of wavelengths by the spectroscopic portion 4, and detects the lights L2 by the light detecting element 5, thereby measuring the wavelength distribution of the light L1, the intensity of a specific wavelength component, or the like.

The substrate 2 is formed into a rectangular plate shape (with, for example, an entire length of 15 to 20 mm, a full width of 11 to 12 mm, and a thickness of 1 to 3 mm), from light-transmitting glass such as BK7, Pyrex (registered trademark) and quartz, plastic, or the like. A wiring board (intermediate substrate) 10 is bonded to the front plane 2a of the substrate 2 with a resin adhesive 16.

The wiring board 10 is formed into a rectangular plate shape (with, for example, an entire length of 15 to 20 mm, a full width of 11 to 12 mm, and a thickness of 0.2 to 1 mm) from a colored resin substrate of polycarbonate or liquid polymer having a light blocking property, an inorganic-organic system colored substrate of glass epoxy or the like, or a material such as silicon or ceramic. A wiring 11 composed of a single layer film of Al, Au, Cu, Ni, or the like, or a laminated film of Cr—Pt—Au, Ti—Pt—Au, Ti—Ni—Au, Cr—Au, or the like is formed on the surface of the wiring board 10. The wiring 11 has a plurality of pad portions 11b disposed in the central area of the substrate 2, a plurality of pad portions 11a disposed at the one end in the longitudinal direction of the substrate 2, and a plurality of connection portions 11c that connect the pad portions 11a and the pad portions 11b which correspond to one another. Further, a rectangular plate shaped opening portion 10a is formed in the center of the wiring board 10.

Figure 3:
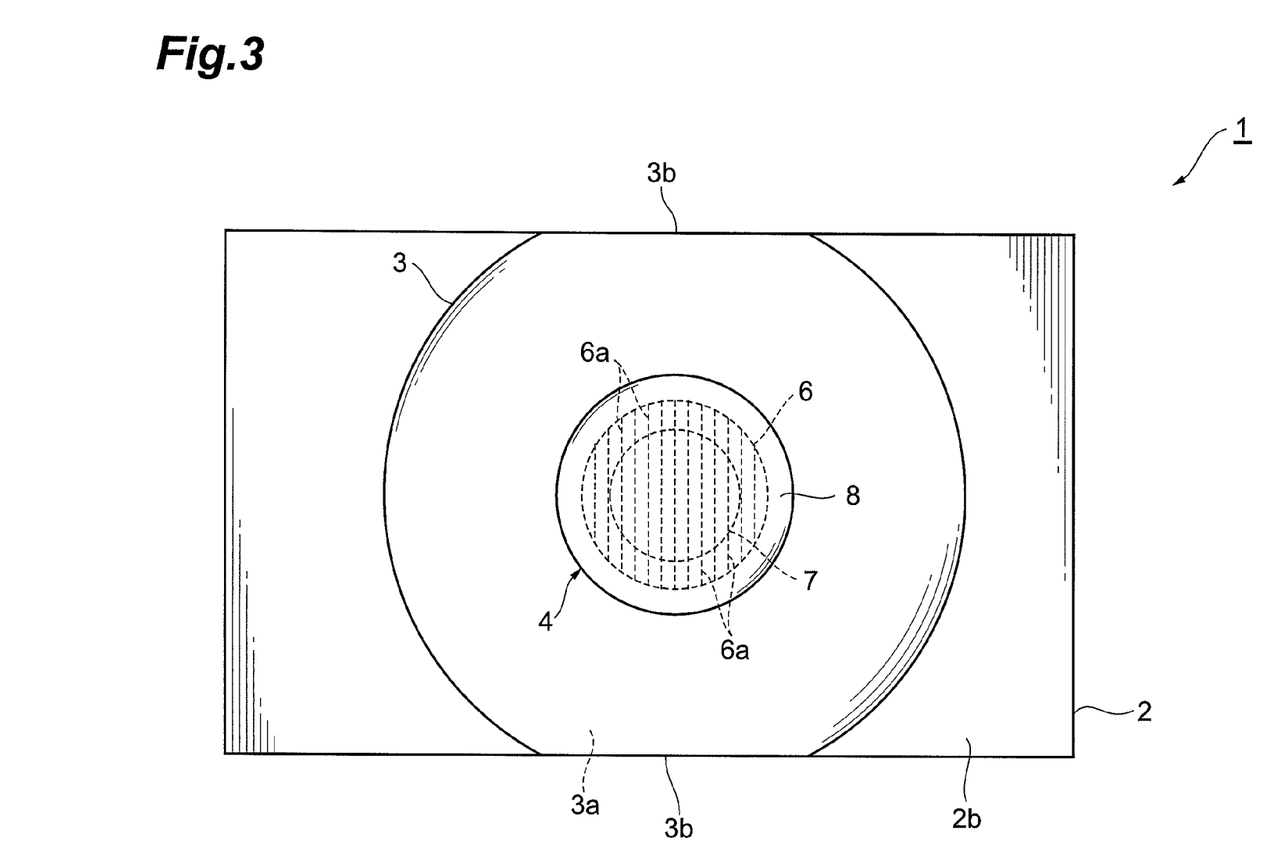
FIG. 3 is a bottom view of the spectroscopy module of FIG. 1.

FIG. 3 is a bottom view of the spectroscopy module of FIG. 1. As shown in FIGS. 2 and 3, the lens portion 3 is formed into a shape such that a semispherical lens is cut off along two planes substantially perpendicular to its bottom plane 3a and substantially parallel to each other to form its side planes 3b (with, for example, a curvature radius of 6 to 10 mm, an entire length of the bottom plane 3a of 12 to 18 mm, a full width of the bottom plane 3a (i.e., a distance between the side planes 3b) of 6 to 10 mm, and a height of 5 to 8 mm), from a material which is the same as that of the substrate 2, that is light-transmitting resin, a light-transmitting organic-inorganic hybrid material, or light-transmitting low-melting point glass or plastic for replica molding, or the like. The lens portion 3 is bonded to a rear plane 2b of the substrate 2 with an optical resin adhesive 18 through which the lights L1 and L2 are allowed to transmit by using the outer edge portion of the substrate 2 such as the corners or the sides of the substrate 2 as a reference portion. At this time, because the spectroscopic portion 4 is positioned with respect to the lens portion 3 with high precision, the outer edge portion of the substrate 2 serves as a reference portion for positioning the spectroscopic portion 4 at the substrate 2. In addition, the lens shape is not limited to a spherical lens, and may be an aspherical lens.

The spectroscopic portion 4 is a reflection type grating having a diffraction layer 6 formed on the outer surface of the lens portion 3, a reflection layer 7 formed on the outer surface of the diffraction layer 6, and a passivation layer 8 that covers the diffraction layer 6 and the reflection layer 7. The diffraction layer 6 is formed so that a plurality of grating grooves 6a are provided adjacent to each other along the longitudinal direction of the substrate 2, and the direction in which the grating grooves 6a are extended is substantially matched to a direction substantially perpendicular to the longitudinal direction of the substrate 2. For example, a cross-sectionally serrated blazed grating, a cross-sectionally rectangular binary grating, a cross-sectionally sinusoidal holographic grating, or the like is applied as the diffraction layer 6, and the diffraction layer 6 is formed by subjecting optical resin for replica molding such as photo curing epoxy resin, acrylic resin, or organic-inorganic hybrid resin to photo curing. The reflection layer 7 is a membrane form, and is formed by, for example, evaporating Al, Au, or the like onto the outer surface of the diffraction layer 6. In addition, an NA of the spectroscopy module 1 can be adjusted by adjusting an area on which the reflection layer 7 is formed. The passivation layer 8 is a membrane form, and is formed by, for example, evaporating $MgF_2$, $SiO_2$, or the like or applying resin onto the outer surfaces of the diffraction layer 6 and the reflection layer 7.

As shown in FIGS. 1 and 2, the light detecting element 5 is disposed on the wiring board 10, and is formed into a rectangular plate shape (with, for example, an entire length of 5 to 10 mm, a full width of 1.5 to 3 mm, and a thickness of 0.1 to 0.8 mm). The light detecting portion 5a is formed on the plane at the side of the spectroscopic portion 4 of the light detecting element 5. The light detecting portion 5a is a CCD image sensor, a PD array, or a CMOS image sensor or the like, and is formed so that a plurality of channels are arrayed in a direction substantially perpendicular to the direction in which the grating grooves 6a of the spectroscopic portion 4 are extended (i.e., the direction in which the grating grooves 6a are provided adjacent to each other).

In the case in which the light detecting portion 5a is a CCD image sensor, light intensity information at a position at which the light is made incident into pixels disposed two-dimensionally is subjected to line-binning, and to make the information into light intensity information at a one-dimensional position, the light intensity information at the one-dimensional position is read out in time-series. That is, a line of the pixels subjected to line-binning becomes one channel. In the case in which the light detecting portion 5a is a PD array or a CMOS image sensor, because light intensity information at a position at which the light is made incident into pixels disposed one-dimensionally is read out in time-series, one pixel becomes one channel.

In addition, in the case in which the light detecting portion 5a is a PD array or a CMOS image sensor, and pixels are arrayed two-dimensionally, a line of pixels arrayed in a direction of a one-dimensional array parallel to the direction in which the grating grooves 6a of the spectroscopic portion 4 are extended becomes one channel. Further, in the case in which the light detecting portion 5a is a CCD image sensor, for example, a light detecting portion 5a in which a space between channels in its array direction is 12.5 µm, an entire length of a channel (a length of a one-dimensional pixel row subjected to line-binning) is 1 mm, and the number of channels to be arrayed is 256 is used for the light detecting element 5.

Further, the light passing hole 5b through which the light L1 advancing to the spectroscopic portion 4 passes, that is provided adjacent to the light detecting portion 5a in the array direction of the channels, is formed in the light detecting element 5. The light passing hole 5b is a slit (with, for example, a length of 0.5 to 1 mm and a width of 10 to 100 µm) which is extended in a direction substantially perpendicular to the longitudinal direction of the substrate 2, and is formed by etching or the like so as to be positioned with high precision with respect to the light detecting portion 5a.

The light detecting element 5 is attached to the wiring board 10 on which the wiring 11 is formed, by face-down bonding. External terminals of the light detecting element 5 and the pad portions 11a of the wiring board 10 are electrically connected via bumps 14. The pad portions 11b are electrically connected to external electric elements (not shown). The light detecting element 5 is disposed such that the light detecting portion 5a and the light passing hole 5b overlap a void formed in the opening portion 10a when viewed from a direction perpendicular to the front plane 2a of the substrate 2. On the plane at the side of the spectroscopic portion 4 of the light detecting element 5, a detection plane of the light detecting portion 5a and a light emission opening B of the light passing hole 5b are exposed in the opening portion 10a. A region between the light detecting element 5 and the wiring board 10 is filled with an underfill material (a resin adhesive) 15 along the rim of the opening portion 10a, which makes it possible to retain mechanical strength.

Further, a light absorption layer to prevent unnecessary light from being made incident into the light detecting element 5 and a stray light cut filter to prevent generation of stray light are formed on the plane at the side of the spectroscopic portion of the light detecting element 5. As a material for the light absorption layer and the stray light cut filter, colored resin (silicone, epoxy, acrylic, urethane, polyimide, or composite resin, or the like) containing black resist or a filler (such as carbon or oxide) can be cited. Further, a light blocking film, a light absorption layer, or the like to prevent light from being made incident into the light detecting element 5 is formed on the plane opposite to the spectroscopic portion of the light detecting element 5.

In the spectroscopy module 1 configured as described above, the light L1 passes through the light passing hole 5b of the light detecting element 5 and the opening portion 10a of the wiring board 10, to be made incident into the substrate 2 from the side of the front plane 2a of the substrate 2, and advances inside the substrate 2, the optical resin adhesive 18, and the lens portion 3 to reach the spectroscopic portion 4. The light L1 which has reached the spectroscopic portion 4 is dispersed into a plurality of lights L2 by the spectroscopic portion 4. The dispersed lights L2 are reflected toward the front plane 2a of the substrate 2 by the spectroscopic portion 4, and advances inside the lens portion 3, the optical resin adhesive 18, the substrate 2 and the opening portion 10a of the wiring board 10 to reach the light detecting portion 5a of the light detecting element 5. The lights L2 which have reached the light detecting portion 5a are detected by the light detecting element 5.

A method for manufacturing the spectroscopy module 1 described above will be described.

First, the spectroscopic portion 4 is formed on the lens portion 3. In detail, a light-transmitting master grating on which gratings corresponding to the diffraction layer 6 are engraved is pushed onto the optical resin for replica molding falling in drops near the tip of the lens portion 3. Then, the optical resin for replica molding is subjected to light in this state to cure the optical resin for replica molding, and the optical resin for replica molding is preferably subjected to thermal curing for stabilization, to form the diffraction layer 6 having the plurality of grating grooves 6a. Thereafter, the master grating is demolded, and Al, Au, or the like is evaporated with a mask or is entirely evaporated onto the outer surface of the diffraction layer 6 to form the reflection layer 7. Moreover, $MgF_2$, $SiO_2$, or the like is evaporated with a mask or is entirely evaporated or a resin is applied onto the outer surfaces of the diffraction layer 6 and the reflection layer 7 to form the passivation layer 8. Then, the substrate 2 is prepared, and the lens portion 3 on which the spectroscopic portion 4 is formed is bonded to the rear plane 2b of the substrate 2 with the optical resin adhesive 18 by using the outer edge portion of the substrate 2 as a reference portion.

Meanwhile, the wiring board 10 and the light detecting element 5 are prepared. In detail, the wiring 11 is formed onto the wiring board 10 having the opening portion 10a by patterning. Next, the light detecting element 5 is mounted onto the wiring board 10 by face-down bonding such that the light detecting portion 5a and the light passing hole 5b are exposed in the opening portion 10a. At this time, the light detecting element 5 and the substrate 2 are electrically connected via the bumps 14. Thereafter, the region between the wiring board 10 and the light detecting element 5 is filled with the underfill material 15 along the rim of the opening portion 10a. Thereafter, the wiring board 10 is bonded to the front plane 2a of the substrate 2 with the resin adhesive 16 by using the outer edge portion of the substrate 2 as a reference portion, to obtain the spectroscopy module 1. In addition, the order of bonding those to the substrate 2 may be set such that any of the lens portion 3 and the wiring board 10 is prior to the other.

The advantageous effects of the above-described spectroscopy module 1 will be described.

In the spectroscopy module 1, the light passing hole 5b through which the light L1 advancing to the spectroscopic portion 4 passes is formed in the light detecting element 5. Therefore, it is possible to prevent the relative positional relationship between the light passing hole 5b and the light detecting portion 5a of the light detecting element 5 from deviating.

Moreover, when the wiring board 10 is bonded to the front plane 2a of the substrate 2, the resin adhesive 16 is stopped at the rim of the opening portion 10a, and does not penetrate into the opening portion 10a. As a result, the region between the light emission opening B and the substrate 2 can be left as a void in the opening portion 10a. Then, the light detecting element 5 is disposed such that the light detecting portion 5a and the light passing hole 5b overlap the void formed in the opening portion 10a when viewed from a direction perpendicular to the front plane 2a of the substrate 2, and on the plane at the side of the spectroscopic portion 4 of the light detecting element 5, the detection plane of the light detecting portion 5a and the light emission opening B of the light passing hole 5b are exposed in the opening portion 10a. According to such a configuration, the light to be measured L1 advancing to the spectroscopic portion 4 via the light passing hole 5b and the diffracted lights L2 advancing to the light detecting portion 5a from the spectroscopic portion 4 pass through the opening portion 10a of the wiring board 10, i.e., the void formed between the light detecting element 5 and the substrate 2 by the opening portion 10a. As a result, because it is possible to prevent a situation in which the light to be measured L1 and the diffracted lights L2 are scattered or the like due to the underfill material 15 or the resin adhesive 16. Therefore, it is possible to prevent generation of stray light, and it is possible to guide the light to be measured L1 to a desired position of the spectroscopic portion 4, and guide the diffracted lights L2 to desired positions of the light detecting portion 5a with high precision. Further, the short-wavelength components of the light to be measured L1 and the diffracted lights L2 are absorbed due to the underfill material 15 or the resin adhesive 16, which makes it possible to prevent a reduction in spectroscopic accuracy in a short-wavelength range. Therefore, according to the spectroscopy module 1, it is possible to improve the reliability.

Further, in the spectroscopy module 1, because the wiring 11 is formed on the wiring board 10 composed of polycarbonate or the like, there is no need to form a wiring on the substrate 2 composed of a glass member or the like, and an attempt can be made to lower the cost of the spectroscopy module 1.

Moreover, in the spectroscopy module 1, because the wiring board 10 has a light-blocking property, it is possible to block a light advancing to the spectroscopic portion 4 without passing through the light passing hole 5b by the wiring board 10, which makes it possible to prevent generation of stray light. Moreover, because the wiring board 10 is formed of a material having a light-blocking property, there is no need to form a light-blocking film or the like on the wiring board 10, and an attempt can be made to lower the cost of the spectroscopy module 1. Further, because there is no need to use a light-transmitting resin as the underfill material 15 and the resin adhesive 16, it is possible to increase the range of resin type choices, which is advantageous in lowering of cost.

Further, in the spectroscopy module 1, because the wiring board 10 is provided between the light detecting element 5 and the substrate 2, the space between the plane at the side of the spectroscopic portion 4 of the light detecting element 5 and the front plane 2a of the substrate 2 is broadened. As a result, the plane at the side of the spectroscopic portion 4 of the light detecting element 5 and the front plane 2a of the substrate 2 come close to one another, which makes it possible to prevent light from being reflected to the respective planes thereof to be multi-scattered. Therefore, it is possible to prevent generation of stray light, which makes it possible to improve the reliability of the spectroscopy module 1.

Further, in the spectroscopy module 1, the light emission opening B is exposed in the opening portion 10a, and the void formed by the opening portion 10a and the outside are communicated with each other via the light passing hole 5b. Thus, when the region between the light detecting element 5 and the wiring board 10 is filled with the underfill material 15, the air inside the opening portion 10a flows out of the light passing hole 5b. Therefore, the underfill material 15 uniformly spreads over the clearance between the light detecting element 5 and the wiring board 10, which makes it possible to reliably bond the light detecting element 5. In the same way, when the wiring board 10 is bonded to the front plane 2a of the substrate 2, the resin adhesive 16 uniformly spreads over the clearance between the wiring board 10 and the substrate 2, which makes it possible to reliably bond the wiring board 10. As a result, an attempt can be made to improve the relative positional relationship among the light detecting element 5, the wiring board 10, and the substrate 2, which makes it possible to improve the reliability of the spectroscopy module 1. Additionally, when the underfill material 15 and the resin adhesive 16 are cured, an organic gas generated from these resins flows out to the outside via the opening portion 10a and the light passing hole 5b, which makes it possible to prevent performance deterioration of the light detecting portion 5a under the effect of accumulated organic gas. Further, because the void formed in the opening portion 10a does not come into a hermetic state, the air in the void is expanded due to a usage environment of the spectroscopy module 1 or the like, which makes it possible to prevent a negative effect such that the relative position between the light detecting element 5 and the spectroscopic portion 4 deviates or the like. Therefore, according to the spectroscopy module 1, it is possible to improve the reliability.

The present invention is not limited to the above-described embodiment.

Figure 4:
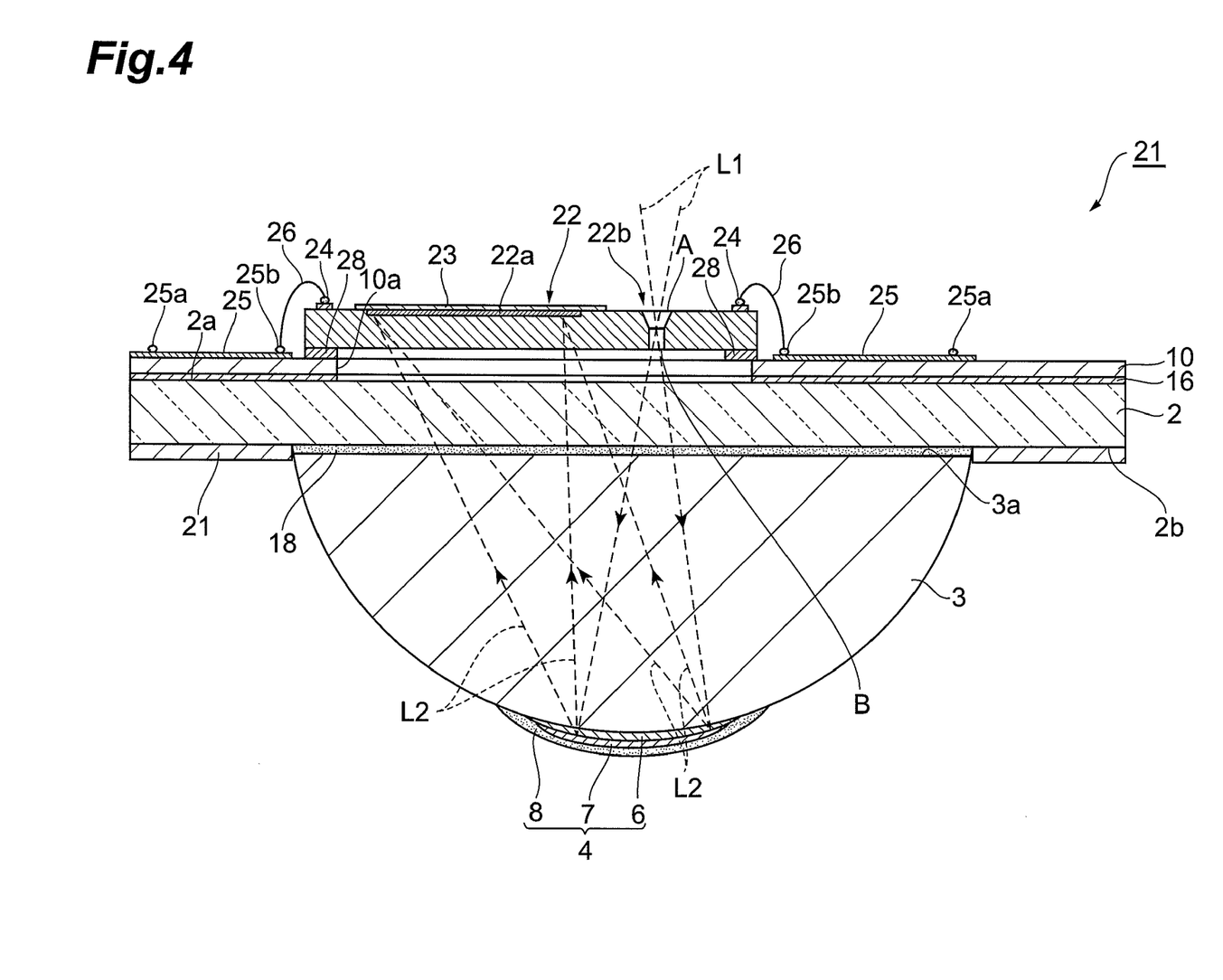
FIG. 4 is a cross sectional view of another embodiment of the spectroscopy module according to the present invention.

FIG. 4 is a cross sectional view of another embodiment of the spectroscopy module according to the present invention. For example, as shown in FIG. 4, the present invention can be applied to a so-called back-illuminated type spectroscopy module 21 in which a light detecting portion 22a is disposed on a plane opposite to the spectroscopic portion 4 of a light detecting element 22 as a preferred embodiment. In the spectroscopy module 21, the wiring board 10 is bonded to the front plane 2a of the substrate 2 with the resin adhesive 16, and the light detecting element 5 is bonded onto the wiring board 10 with a resin adhesive 28. A plurality of terminal electrodes 24 are formed on the plane opposite to the spectroscopic portion 4 of the light detecting element 22, and the respective terminal electrodes 24 are connected to pad portions 25b of a wiring 25 formed on the wiring board 10 by patterning, with wires 26. Thereby, the terminal electrodes 24 and the wiring 25 are electrically connected, and electric signals generated in the light detecting portion 22a are led to the outside via the terminal electrodes 24, the pad portions 25b, and the pad portions 25a of the wiring 25.

The light detecting element 22 is disposed such that the light detecting portion 22a and a light passing hole 22b overlap the void formed in the opening portion 10a when viewed from a direction perpendicular to the front plane 2a of the substrate 2. On the plane at the side of the spectroscopic portion 4 of the light detecting element 22, the light emission opening B of the light passing hole 22b is exposed in the opening portion 10a.

In the spectroscopy module 21 configured as described above, the light L1 passes through the light passing hole 22b of the light detecting element 22 and the opening portion 10a of the wiring board 10, to be made incident into the substrate 2 from the side of the front plane 2a of the substrate 2, and advances inside the substrate 2, the optical resin adhesive 18, and the lens portion 3 to reach the spectroscopic portion 4. The light L1 which has reached the spectroscopic portion 4 is dispersed into lights L2 corresponding to a plurality of wavelengths by the spectroscopic portion 4. The lights L2 dispersed and reflected toward the front plane 2a of the substrate 2 by the spectroscopic portion 4 advance inside the lens portion 3, the optical resin adhesive 18, the substrate 2, the opening portion 10a of the wiring board 10, and the light detecting element 22, to reach the light detecting portion 22a. The lights L2 which have reached the light detecting portion 22a are detected by the light detecting element 22. According to the spectroscopy module 21, the same effects as those of the spectroscopy module 1 can be obtained.

Further, the shape of the opening portion 10a is not limited to a rectangular plate shape, and may be, for example, a substantially elliptical plate shape or a substantially oval plate shape. Further, the present invention may be configured in a mode in which only the light L1 advancing to the spectroscopic portion 4 passes through the opening portion 10a, and the lights L2 dispersed and reflected by the spectroscopic portion 4 do not pass through the opening portion 10a (i.e., a mode in which the lights L2 pass through the inside of the wiring board 10). In this case, the wiring board 10 is formed of a material through which at least the lights L2 are allowed to pass.

Further, the substrate 2 and the lens portion 3 may be integrally formed so that the rear plane 2b of the substrate 2 and the bottom plane 3a of the lens portion 3 correspond to one another, from light-transmitting glass such as BK7, Pyrex (registered trademark), or quartz, plastic, or the like. Further, the lens portion 3 and the diffraction layer 6 may be integrally formed of light-transmitting low-melting point glass or plastic for replica molding or the like.

In accordance with the present invention, it is possible to improve the reliability of the spectroscopy module.

What is claimed is:

1. A spectroscopy module comprising:
    a body portion through which light is allowed to transmit;
    a spectroscopic portion that disperses a light made incident into the body portion from a side of a predetermined plane of the body portion, and reflects lights to the side of the predetermined plane; and
    a light detecting element disposed on the predetermined plane via an intermediate substrate, and having a light detecting portion to detect the lights dispersed by the spectroscopic portion, wherein
    a light passing hole, through which the light advancing to the spectroscopic portion passes, is formed in the light detecting element, and
    wherein an opening portion through which both the light advancing to the spectroscopic portion via the light passing hole and the lights advancing to the light detecting portion from the spectroscopic portion pass, is formed in the intermediate substrate.

2. The spectroscopy module according to claim 1, wherein a wiring for electrically connecting the light detecting element to the outside is provided on the intermediate substrate.

3. The spectroscopy module according to claim 1, wherein the intermediate substrate has a light-blocking property.

4. The spectroscopy module according to claim 1, wherein the intermediate substrate and the light detecting element are bonded to one another along a rim of the opening portion with a resin adhesive.

5. A method for manufacturing a spectroscopy module, which is provided with a body portion through which light is allowed to transmit, a spectroscopic portion that disperses a light made incident into the body portion from a side of a predetermined plane of the body portion, and reflects lights to the side of the predetermined plane, and a light detecting element having a light detecting portion to detect the lights dispersed by the spectroscopic portion, the method for manufacturing the spectroscopy module comprising:
    a light detecting element disposing step of disposing the light detecting element in which a light passing hole is formed, to an intermediate substrate in which an opening portion through which the light advancing to the spectroscopic portion via the light passing hole and the lights advancing to the light detecting portion from the spectroscopic portion pass, is formed;
    an intermediate substrate disposing step of disposing the intermediate substrate onto the predetermined plane after the light detecting element disposing step; and
    a spectroscopic portion disposing step of disposing the spectroscopic portion into the body portion.

6. A spectroscopy module comprising:
    a body portion through which light is allowed to transmit;
    a spectroscopic portion that disperses a light made incident into the body portion from a side of a predetermined plane of the body portion, and reflects lights to the side of the predetermined plane; and
    a light detecting element disposed on the predetermined plane via an intermediate substrate, and having a light detecting portion to detect the lights dispersed by the spectroscopic portion;
    wherein an opening portion, through which the lights advancing to the light detecting portion from the spectroscopic portion pass, is formed in the intermediate substrate.

7. A spectroscopy module according to claim 1, wherein a void is formed between the light detecting element and the body portion by the opening portion of the intermediate substrate.

8. A spectroscopy module according to claim 6, wherein a void is formed between the light detecting element and the body portion by the opening portion of the intermediate substrate.

* * * * *